(12) United States Patent
Tachiiwa

(10) Patent No.: US 11,887,489 B2
(45) Date of Patent: Jan. 30, 2024

(54) STORAGE FACILITY MANAGEMENT DEVICE

(71) Applicant: KDDI CORPORATION, Tokyo (JP)

(72) Inventor: Masayuki Tachiiwa, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 606 days.

(21) Appl. No.: 17/040,663

(22) PCT Filed: Mar. 12, 2019

(86) PCT No.: PCT/JP2019/009991
§ 371 (c)(1),
(2) Date: Sep. 23, 2020

(87) PCT Pub. No.: WO2019/188250
PCT Pub. Date: Oct. 3, 2019

(65) Prior Publication Data
US 2021/0020054 A1 Jan. 21, 2021

(30) Foreign Application Priority Data
Mar. 28, 2018 (JP) ................. 2018-062970

(51) Int. Cl.
*G06T 7/00* (2017.01)
*G08G 5/00* (2006.01)
(Continued)

(52) U.S. Cl.
CPC .......... *G08G 5/0073* (2013.01); *B64F 1/222* (2013.01); *G06T 7/60* (2013.01); *G06T 7/70* (2017.01);
(Continued)

(58) Field of Classification Search
CPC .... G08G 5/0073; G08G 5/0013; G08G 5/045; G06T 7/70; G06T 7/60; G06T 2207/30252; B64F 1/222
(Continued)

(56) References Cited

U.S. PATENT DOCUMENTS 9,056,676 B1 6/2015 Wang
9,718,564 B1 8/2017 Beckman et al.
(Continued)

FOREIGN PATENT DOCUMENTS

CN 107407940 A 11/2017
CN 107672811 A 2/2018
(Continued)

OTHER PUBLICATIONS

Office Action issued in corresponding Japanese Patent Application No. 2021-081903 dated Nov. 2, 2021 with English translation.
(Continued)

Primary Examiner — Tyler J Lee
Assistant Examiner — Tiffany P Ohman
(74) Attorney, Agent, or Firm — Foley & Lardner LLP

(57) ABSTRACT

A storage facilities management device is configured to manage storage facilities such as storage sheds for keeping flight devices. Upon receiving instruction information including a takeoff/landing time of a flight device from a flight management device, the storage facilities management device acquires circumferential information representing circumstances of a storage shed before the takeoff/landing time so as to determine whether or not the flight device is able to take off at the takeoff time of the instruction information or to determine whether or not the flight device is able to land at the landing time of the instruction information according to the circumferential information, thus transmitting the determination result to the flight manage- (Continued)

ment device and allowing for takeoff or landing of the flight device according to the instruction information.

9 Claims, 9 Drawing Sheets

(51) Int. Cl.
*G06T 7/70* (2017.01)
*B64F 1/22* (2006.01)
*G06T 7/60* (2017.01)
*G08G 5/04* (2006.01)

(52) U.S. Cl.
CPC ............ *G08G 5/0013* (2013.01); *G08G 5/045* (2013.01); *G06T 2207/30252* (2013.01)

(58) Field of Classification Search
USPC .......................................................... 701/15
See application file for complete search history.

(56) References Cited

U.S. PATENT DOCUMENTS

| | | |
|---|---|---|
| 2017/0003689 A1 | 1/2017 | Lee |
| 2017/0045894 A1 | 2/2017 | Canoy et al. |
| 2017/0336805 A1 | 11/2017 | Luo et al. |
| 2018/0059659 A1 | 3/2018 | Takeuchi et al. |
| 2018/0203465 A1 | 7/2018 | Suzuki |
| 2018/0290745 A1 | 10/2018 | Kumada |
| 2018/0354649 A1* | 12/2018 | Ortiz ..................... B64C 39/024 |
| 2019/0130770 A1* | 5/2019 | Di Benedetto ...... G08G 5/0026 |

FOREIGN PATENT DOCUMENTS

| | | | | |
|---|---|---|---|---|
| EP | 2 886 493 A1 | 6/2015 | | |
| JP | 2013-119328 A | 6/2013 | | |
| JP | 5874940 B1 | 3/2016 | | |
| JP | A-2017-037368 | 2/2017 | | |
| JP | 2017-527493 A | 9/2017 | | |
| WO | WO-2017/006421 A1 | 1/2017 | | |
| WO | WO-2017006421 A1 * | 1/2017 | ............. | A47G 29/14 |
| WO | WO-2017/061589 A1 | 4/2017 | | |
| WO | WO-2017061589 A1 * | 4/2017 | ........... | B64C 39/024 |
| WO | WO-2017/115807 A1 | 7/2017 | | |

OTHER PUBLICATIONS

Office Action issued in Chinese Patent Application No. 201980021954.1 dated Dec. 28, 2021, with English Translation.
International Search Report issued in corresponding application No. PCT/JP2019/009991 dated Apr. 9, 2019 with English translation.
Qinghua Huang, Science & Technology Information, vol. 3, Application of GPS in Aircraft Takeoff and Landing Performance Test, Jan. 25, 2011.
Notice of Allowance issued in Corresponding Chinese Application No. 201980021954.1 dated Jun. 6, 2022 with partial English Translation.
Office Action issued in corresponding Japanese Patent Application No. 2021-081903 dated Jun. 22, 2021 with English translation.

* cited by examiner

| PORT ID | STORAGE SHED NO | FLIGHT DEVICE IN STORAGE SHED | TAKEOFF SCHEDULE |
|---|---|---|---|
| ABC | 01 | D-001 | 2/28 10:00 |
| | 02 | D-003 | 3/1 13:00 |
| | 03 | VACANT | — |

DEF/02

| DRONE ID | LANDING TIME | TAKEOFF TIME |
|---|---|---|
| D-002 | 2/28 10:00 | 2/28 13:00 |
| D-003 | 2/28 14:00 | 2/28 17:00 |
| D-005 | 2/28 20:00 | 3/1 09:00 |

STORAGE FACILITY MANAGEMENT DEVICE

TECHNICAL FIELD

The present invention relates to a storage facilities management device configured to manage storage sheds used to keep flight devices.

The present application claims the benefit of priority on Japanese Patent Application No. 2018-62970 filed on Mar. 28, 2018, the subject matter of which is hereby incorporated herein by reference.

BACKGROUND

Patent Document 1 discloses a flight management device configured to issue operation instructions to flight devices. The flight management device receives the instruction information to give operation instructions to flight devices. The flight management device may have jobs registered based on the received instruction information, the performance information for multiple flight devices registered in advance, and the current status of flight devices. Next, the flight management device gives operation instructions to one or more flight devices based on the registered jobs.

CITATION LIST

Patent Literature Document

Patent Document 1: International Publication No. 2017/061589

SUMMARY

Technical Problem

The flight management device disclosed in Patent Document 1 is designed to move a flight device to a job-start position at a job-start time and then to move the flight device to a job-finished position upon finishing all operations included in units of jobs. As described above, the flight management device of Patent Document 1 may carry out a predetermined operation at the job-start time. However, it is necessary to realize fears that the flight management device might mistakenly give an operation instruction to take off a flight device although the flight device cannot make a takeoff or an operation instruction to land the flight device although the flight device cannot make a landing. Therefore, the flight management device may suffer from a problem regarding the safety of flight devices when making a takeoff or landing.

The present invention is made in consideration of the aforementioned circumstances and aims to provide a technology to improve the safety of a flight device when making a takeoff or landing.

According to the present invention, a storage facilities management device includes a reception control part configured to receive the instruction information including a time to take off or land a flight device from a flight management device configured to fly the flight device, an information acquisition part configured to acquire the circumferential information representing circumstances of a storage shed configured to keep the flight device before the time included in the instruction information, a determination part configured to determine whether or not the flight device is able to take off when the reception control part receives the instruction information including the time to take off the flight device or to determine whether or not the flight device is able to land when the reception control part receives the instruction information including the time to land the flight device according to the circumstances indicated by the circumferential information, and a transmission control part configured to transmit a determination result of the determination part to the flight management device.

When the reception control part receives the instruction information including the time to land the flight device, the determination part is configured to determine that the flight device is able to land due to existence of the storage shed capable of keeping the flight device but to determine that the flight device is unable to land due to nonexistence of the storage shed capable of keeping the flight device.

The reception control part may receive the first instruction information including a first time while the reception control part may receive the second instruction information including a second time after receiving the first instruction information. The determination part is configured to determine that the flight device associated with the second instruction information is unable to take off or land when a time difference between the first time and the second time is equal to or below a predetermined time, while the determination part is configured to determine that the flight device associated with the second instruction information is able to take off or land when the time difference is longer than the predetermined time.

When the determination part determines that the flight device is able to land, the transmission control part is configured to transmit the position information representing a position of the storage shed and the landing-period information representing a time period in which the flight device is able to land.

When the determination part determines that the flight device is unable to land since the flight device is unable to land at a first storage shed included in first storage facilities among a plurality of storage facilities, the transmission control part is configured to transmit the position information representing a position of second storage facilities having a shorter distance from the first storage facilities than other storage facilities and the landing-period information representing a time period in which the flight device is able to land at another storage shed installed in the second storage facilities.

The storage facilities management device may further include a storage unit configured to store a storage identification used to identify the storage shed in association with a flight-device identification used to identify the flight device which lands at the storage shed.

The reception control part is configured to receive the flight-device identification used to identify the flight device and the instruction information including the time to take off the flight device, while the information acquisition part is configured to acquire the circumferential information representing the circumstances of the storage shed identified by the storage identification which is stored on the storage unit in association with the flight-device identification.

The information acquisition part is configured to acquire the weather information relating to weather in the periphery of the storage shed or the obstacle information representing existence of an obstacle in the periphery of the storage shed.

When the determination part determines that the flight device is able to take off or land, the transmission control part is configured to transmit to a storage control device configured to control the storage shed a door-open instruction to open a door of the storage shed.

The reception control part is configured to receive the door-open-completion information representing a completion of opening the door of the storage shed from the storage control device, while the transmission control device is configured to transmit the door-open-completion information to the flight management device when the reception control part receives the door-open-completion information.

The reception control part is configured to receive the operation-completion information representing a completion of a takeoff or a landing of the flight device from the storage control device, while the transmission control device is configured to transmit a door-close instruction to close the door of the storage shed to the storage control device when the reception control part receives the operation-completion information.

The reception control part is configured to receive an image of the flight device to take off or an image of the flight device to land from the storage control device configured to control the storage shed, while the transmission control part is configured to transmit the image received by the reception control part to the flight management device.

Advantageous Effects of Invention

The present invention achieves an advantageous effect of improving the safety of a flight device when making a takeoff or landing.

DETAILED DESCRIPTION

[Outline of Flight Management System S According to Embodiment]

Figure 1:
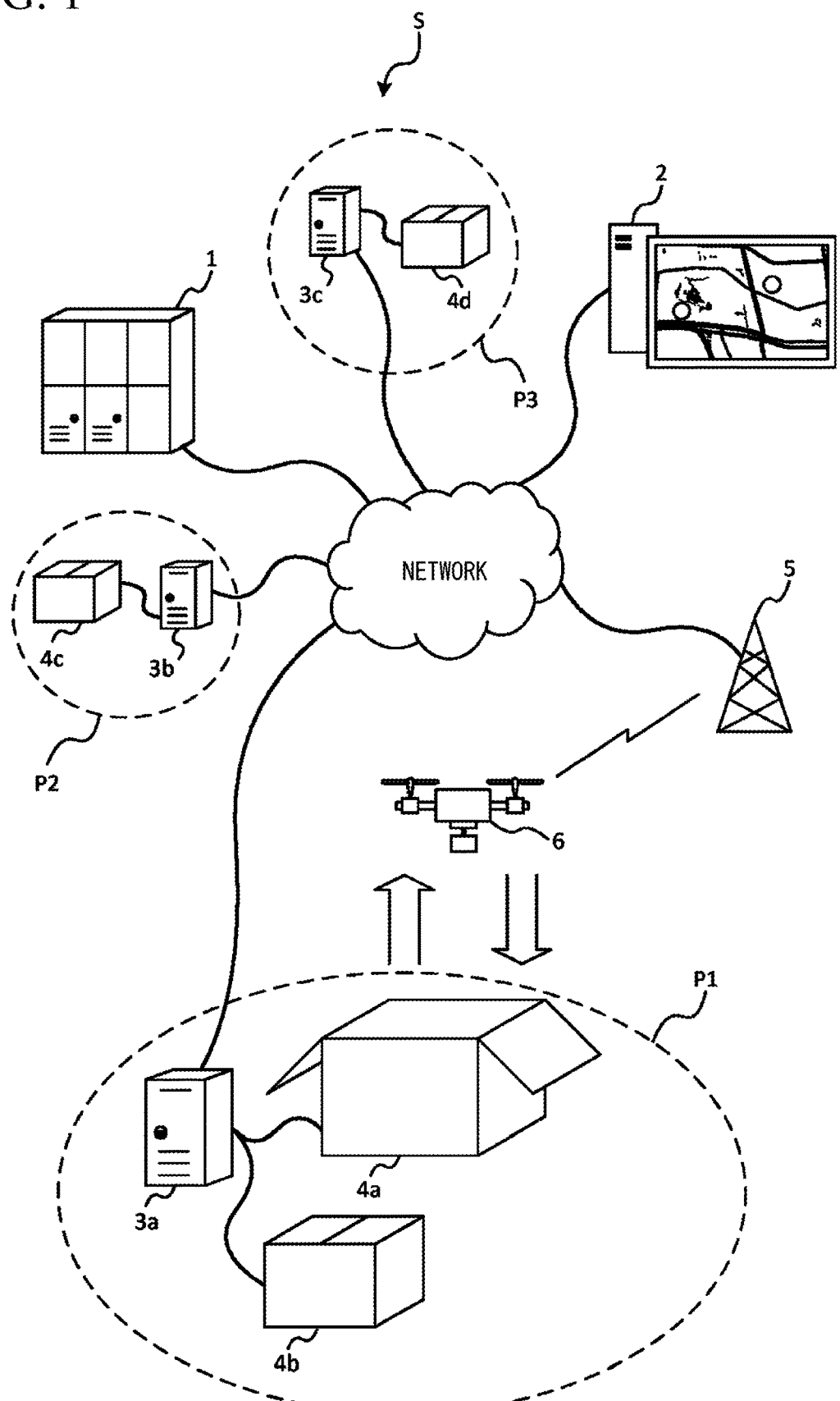
FIG. 1 is a schematic diagram showing the outline of a flight management system according to one embodiment of the present invention.

FIG. 1 is a schematic diagram for explaining the outline of a flight management system S according to the embodiment. The flight management system S is designed to manage a plurality of flight devices 6 which are controlled to fly according to predetermined flight routes. The flight management system S includes a storage facilities management device 1, a flight management device 2, a plurality of storage control devices 3 (3a, 3b, 3c), a plurality of storage sheds 4 (4a, 4b, 4c, 4d), a base station 5, and a flight device 6. The storage facilities management device 1, the flight management deice 2, the storage control devices 3, the base station 5, and the flight device 6 are connected to a network. For example, the network is configured of the Internet.

A port P1 show by dotted lines indicates flight-device storage facilities including the storage sheds 4a and 4b used to keep the flight devices 6 and the storage control device 3a. Ports P2 and P3 indicate flight-device storage facilities similar to the flight-device storage facilities of port P1. Hereinafter, those ports will be each denoted as a port P without discriminating them unless otherwise stated the need of discrimination.

The storage control device 3 is configured to acquire the circumferential information representing circumstances of the port P equipped with the storage shed 4. For example, the storage control device 3 is equipped with a digital camera configured to capture an image of circumstances of the port P. The storage control device 3 is configured to acquire the image captured by a digital camera as the circumferential information representing circumstances of the storage shed 4. In addition, the storage control device 3 can be equipped with sensors such as a temperature-humidity meter, a barometer, an airflow-direction meter, a hyetometer, and an optical sensor. The storage control device 3 may acquire signal values output from sensors as the circumferential information representing circumstances of the port P equipped with storage shed 4.

The storage facilities management device 1 may be a server configured to manage conditions with respect to a plurality of ports P. For example, the storage facilities management device 1 may acquire the circumferential information representing circumstances of the storage sheds 4 from a plurality of storage control devices 3 installed in a plurality of ports P.

The flight management device 2 is configured to transmit a flight instruction to the flight 6, thus making the flight device 6 fly in the air. A user who needs to fly the flight device 6 may input a flight route of the flight device 6 to the flight management device 2 via a communication terminal held by the user. Upon receiving the user's flight route of the flight device 6, the flight management device 2 controls the flight device 6 to fly according to the flight route. In addition, the user is allowed input to the flight management device 2 an instruction to acquire the status of the flight device 6. Upon receiving the instruction to acquire the status of the flight device 6, the flight management device 2 may acquire the information representing the status of the flight device 6 so as to output the information to the communication terminal held by the user. In the present embodiment, the flight management system S is equipped with a single flight management device 2, but the flight management system S may be equipped with a plurality of flight management devices 2.

For example, the flight device 6 may serve as a rotorcraft having multiple rotors. The flight device 6 may fly in the air according to the fight route received from the flight management device 2 via the base station 5. Specifically, upon receiving the flight route, the flight device 6 may take off from the storage shed 4 used to keep the flight device 6. The flight device 6 makes a landing with the storage shed 4 after flying according to the flight route.

Even when the flight device 6 is about to take off from the storage shed 4 or to land at the storage shed 4, the flight device 6 cannot make a takeoff or landing normally according to circumstances of the storage shed 4. When strong wind may blow in the periphery of the storage shed 4, for example, the flight device 6 cannot fly in the air according to the flight route since the flight device 6 would be swept by wind, wherein the fight device 6 should not make a takeoff or landing at the storage shed 4.

However, the flight management device 2 does not grasp circumstances of the port P equipped with the storage shed 4. For this reason, it is concerned with fears that the flight management device 2 might transmit a takeoff instruction to take off the flight device 6 which cannot take off from the storage shed 4 or a landing instruction to land the flight device 6 which cannot land at the storage shed 4.

The flight management system S is configured to determine whether or not the flight device 6 can take off or land based on circumstances of the storage shed 4. According to the determination result, the flight management system S may transmit a takeoff instruction or a landing instruction to the flight device 6. Hereinafter, the outline of processing executed by the flight management system S will be described below.

[Outline of Processing of Flight Management System S According to Embodiment]

Figure 2:
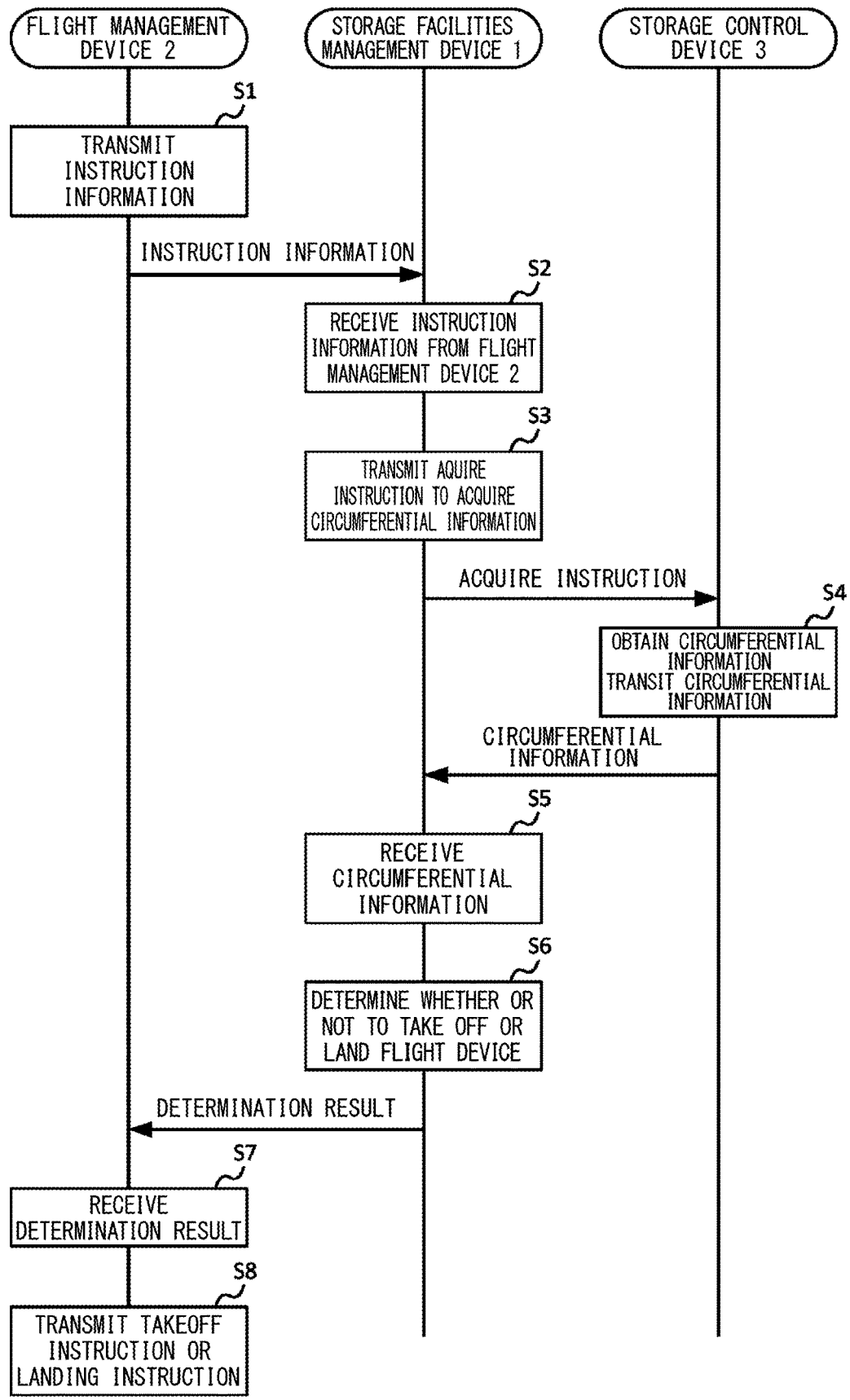
FIG. 2 is a sequence diagram showing the operation of the flight management system according to the present embodiment.

FIG. 2 is a sequence diagram showing the operation of the flight management system S according to the embodiment. First, the flight management device 2 transmits the instruction information including the time to take off the flight device 6 and the time to land the flight device 6 to the storage facilities management device 1 (step S1). The storage facilities management device 1 receives the instruction information from the flight management device 2 (step S2).

Before the time(s) included in the instruction information, the storage facilities management device 1 transmits an acquire instruction to the storage control device 3 (step S3). The acquire instruction is issued to acquire the circumferential information representing circumstances of the port P equipped with the storage shed 4. Upon receiving the acquire instruction, the storage control device 3 acquires the circumferential information representing circumstances of the storage shed 4 so as to transmit the circumferential information of the port P equipped with the storage shed 4 to the storage facilities management device 1 (step S4).

The storage facilities management device 1 receives the circumferential information from the storage control device 3 (step S5). Based on circumstances indicated by the circumferential information of the port P, the storage facilities management device 1 determines whether or not the flight device 6 can take off or land at the storage shed 4 (step S6). Subsequently, the storage facilities management device 1 transmits the determination result to the flight management device 2.

The flight management device 2 receives the determination result from the storage facilities management device 1 (step S7). Based on the determination result, the flight management device 2 transmits to the flight device 6 a takeoff instruction to take off the flight device 6 from the storage shed 4 or a landing instruction to land the flight device 6 at the storage shed 4 (step S8).

As described above, it is possible to suppress the flight management system S from mistakenly issuing a takeoff instruction to take off the flight device 6 which cannot take off from the storage shed 4 or a landing instruction to land the flight device 6 which cannot land at the storage shed 4. Accordingly, it is possible for the flight management system S to improve the safety of the flight device 6 when taking off or landing.

[Functional Configuration of Storage Facilities Management Device 1]

Figure 3:
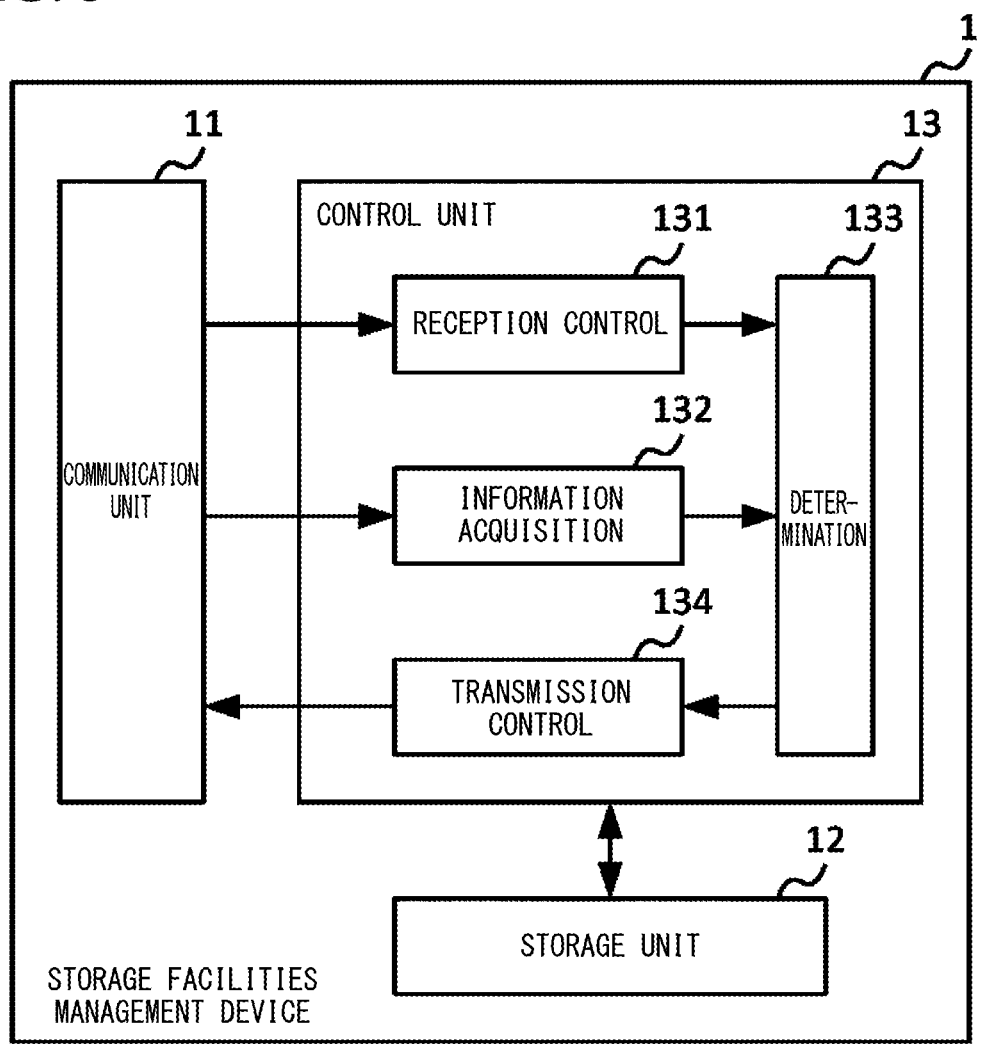
FIG. 3 is a block diagram of a storage facilities management device according to the present embodiment.

FIG. 3 is a block diagram showing the functional configuration of the storage facilities management device 1. The storage facilities management device 1 includes a communication unit 11, a storage unit 12, and a control unit 13. The communication unit 11 is a communication module configured to transmit or receive information with other devices. For example, the communication unit 11 may be a LAN (Local Area Network) module.

The storage unit 12 may be storage media including ROM (Read-Only Memory), RAM (Random-Access Memory), and the like. The storage unit 12 stores programs to be executed by the control unit 13. For example, the storage unit 12 is configured to store an association between the storage identifications for identifying the storage sheds 4 and the flight-device identifications for identifying the flight devices 6 which may land at the storage sheds 4. Specifically, the storage unit 12 stores a data table showing an association between the storage identifications and the flight-device identifications.

Figures 4A, 4B:
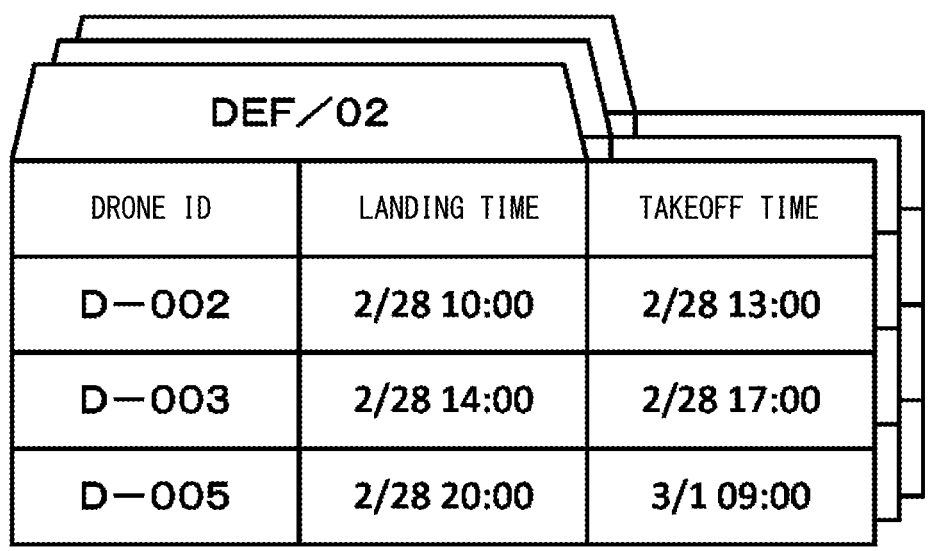
FIG. 4A shows a data table illustrating an association between storage identifications and flight-device identifications representing flight devices kept in storage sheds stored in the storage facilities management device of the present embodiment.
FIG. 4B shows a data table illustrating an association between a flight device, a takeoff time and a landing time of the flight device kept for each storage identification in the storage facilities management device of the present embodiment.

FIGS. 4A and 4B show data tables which are stored on the storage unit 12 and show an association between storage identifications and flight-device identifications. Specifically, FIG. 4A diagrammatically shows a data table configured to store an association between storage identifications (Storage-Shed Numbers) and flight-device identifications representative of the flight devices 6 currently kept in the storage sheds 4.

As shown in FIG. 4A, the storage unit 12 may store an association between storage identifications and port IDs used to identify the ports P equipped with the storage sheds 4 or an association between port IDs and flight-device identifications. When the flight device 6 is kept in the storage shed 4, the storage unit 12 may store a takeoff-scheduled time representing a scheduled time to take off the flight device 6 kept in the storage shed 4. When the flight device 6 is not kept in the storage shed 4, the storage unit 12 may store the information indicating that the flight device 6 is not kept in the storage shed 4 identified by its storage identification. As described above, it is possible for a manager of the storage facilities management device 1 to grasp the usage status of the storage shed 4 with reference to the storage unit 12 configured to store the usage status of the storage shed 4.

In addition, the storage unit 12 may store an association between a flight-device identification, a landing time representing a scheduled time to land the flight device 6 at the storage shed 4, and a takeoff time representing a scheduled time to take off the flight device 6 from the storage shed 4 with respect to each of storage identifications.

FIG. 4B diagrammatically shows a data table describing an association between a flight-device identification (or a drone ID), a landing time and a takeoff time with respect to each of storage identifications stored on the storage unit 12. This makes is possible for a manager of the storage facilities management device 1 to manage the takeoff/landing status of the flight device 6 in the storage shed 4.

In this connection, the storage unit 12 may store the position information representing the positions of ports identified by port IDs in association with port IDs. For example, the position information representing the position of each port ID may be geographical coordinates including latitude information representing a latitude and longitude information representing a longitude; but this is not a restriction. In addition, the position information may include the height or the altitude of a building located at the position of the position information in addition to the latitude information and the longitude information.

The control unit 13 may be a calculation resource including a processor such as a CPU (Central Processing Unit). The control unit 13 is configured to execute programs stored on the storage unit 12, thus realizing various functions such as a reception control part 131, an information acquisition part 132, a determination part 133, and a transmission control part 134.

(Process of Flight Device 6 to Take Off from Storage Shed 4)

First, the process of the flight device 6 to take off from the storage shed 4 will be described below. In this case, the reception control part 131 receives the instruction information (hereinafter, referred to as a takeoff instruction) including the time to take off the flight device 6 from the flight management device 2. Specifically, the reception control part 131 receives a flight-device identification identifying the flight device 6 to take off from the storage shed 4 and a takeoff instruction including an instruction to take off the flight device 6 identified by the flight-device identification.

When it comes to a predetermined time before the time included in the instruction information received by the reception control part 131, the information acquisition part 132 receives the circumferential information from the storage control device 3. The circumferential information represents circumstances of the port P equipped with the storage shed 4 configured to keep the flight device 6. For example, the information acquisition part 132 is configured to acquire the circumferential information before a time in which it would be assumed that circumstances of the port P detected at a time of acquiring the circumferential information could be maintained until the time included in the instruction information. Accordingly, it is possible for the storage facilities management device 1 to improve accuracy of determining whether or not the flight device 6 can take off at a takeoff time.

The information acquisition part 132 acquires the circumferential information of the port P equipped with the storage shed 4 identified by a storage identification which is stored on the storage unit 12 in association with a flight-device identification used to identify the flight device 6 indicated by a takeoff instruction. For example, the information acquisition part 132 may acquire the weather information relating to the weather in the periphery of the port P equipped with the storage shed 4 as the circumferential information representing circumstances of the port P. For example, the weather information relating to the weather in the periphery of the port P equipped with the storage shed 4 may represent weather such as fine and rain, rainfall, wind speed, wind direction, and atmospheric pressure; but this is not a restriction. The information acquisition part 132 may acquire the circumferential information including the obstacle information indicating the existence of an obstacle in the periphery of the storage shed 4. As an object serving as an obstacle, for example, it is possible to mention an object which may exist at an entry/exit port of the storage shed 4 in the port P, a person or animal which may exist in proximity to an entry/exit port of the storage shed 4. For example, the information acquisition part 132 may acquire as the circumferential information an image (or a video) produced by a digital camera installed in the port P which may capture an image of the neighborhood of the storage shed 4 in real time. Based on the captured image (or video), the information acquisition part 132 determines whether or not an obstacle may exist in proximity to an entry/exit port of the storage shed 4.

The determination part 133 determines whether or not the flight device 6 can take off based on circumstances of the port P indicated by the circumferential information acquired by the information acquisition part 132. In this connection, details of the process which is executed by the determination part 133 to determine whether or not the flight device 6 can take off based on circumstances of the port P will be described later.

(Process of Flight Device 6 to Land at Storage Shed 4)

Next, a process of the flight device 6 to land at the storage shed 4 will be described below. In this connection, before the flight device 6 starts to fly in the air, the flight management system S reserves the storage shed 4 used to land the flight device 6 after its flight. Specifically, before the flight device 6 starts to fly in the air, the flight management device 2 transmits to the storage facilities management device 1 a port ID used to identify the port P for landing the flight device 6 and a landing time for landing the flight device 6 in association with a flight-device identification used to identify the flight device 6 subjected to landing.

Upon receiving from the flight management device 2 the port ID and the landing time associated with the flight-device identification, the storage facilities management device 1 determines whether or not the flight device 6 identified by the flight-device identification can be kept in the storage shed 4 installed in the port P identified by the port ID. Specifically, the information acquisition part 132 acquires the airframe information of the flight device 6 identified by the flight-device identification received by the reception control part 131. The airframe information represents the performance and specifications of the flight device 6. As the performance and specifications of the flight device 6, it is possible to mention the overall height, the overall length, a center distance between motor shafts, a flight time, the maximum payload, the maximum speed, existence/nonexistence of waterproofness, and the like; but this is not a restriction.

Next, the determination part 133 determines that the flight device 6 cannot land at the storage shed 4 when the overall height and the overall length of the flight device 6 indicated by the airframe information are larger than the capacity size of the storage shed 4. On the other hand, the determination part 133 determines that the flight device 6 can be landed at the storage shed 4 when the overall height and the overall length of the flight device 6 indicated by the airframe information are smaller than the capacity size of the storage shed 4. Upon determining that the flight device 6 can be kept in the storage shed 4, the storage facilities management device 1 stores a storage identification used to identify the storage shed 4 accommodating the flight device 6 in association with a flight-device identification and a landing time. As described above, the flight management system S may reserve the storage shed 4 at which the flight device 6 will be landed.

Next, a process in which the flight management system S may instruct the flight device 6 to land after finishing its flight according to the flight route will be described below. Upon receiving a user's landing instruction to land the flight device 6 or when the flight device 6 finishes its flight according to the flight route, the flight management device 2 transmits to the storage facilities management device 1 the instruction information (hereinafter, referred to as a landing instruction) including the time to land the flight device 6.

The reception control part 131 of the storage facilities management device 1 receives from the flight management device 2 a landing instruction to land the flight device 6. Specifically, the reception control part 131 receives a landing instruction including a flight-device identification used to identify the flight device 6 to be landed at the storage shed 4 and an instruction to land the flight device 6 identified by the flight-device identification.

When the reception control part 131 receives the landing instruction to land the flight device 6, the information acquisition part 132 acquires the circumferential information representing circumstances of the port P from the storage control device 3 of the port P identified by the port ID associated with the flight-device identification used to identify the flight device 6. Subsequently, the determination part 133 determines whether or not the flight device 6 can be landed at the storage shed 4 according to circumstances of the port P indicated by the circumferential information acquired by the information acquisition part 132. In this connection, the details of the process of the determination part 133 to determine whether or not the flight device 6 can be landed according to circumstances will be described later.

Due to a change of weather or a change of the flying state of the flight device 6, it would be preferable to land the flight device 6 at a different storage shed 4 than the reserved storage shed 4. In this case, the flight management device 2 may transmit a landing instruction and a port ID. In addition, the flight management device 2 may transmit the landing instruction together with the position information representing the position of the flight device 6 or the position information representing the position to land the flight device 6. For example, the flight management device 2 may transmit the position information in association with a flight range representing a range of distance in which the flight device 6 can fly from the position of the position information.

When the reception control part 131 receives the port ID together with the landing instruction, the information acquisition part 132 acquires the circumferential information representing circumstances from the storage control device 3 of the port P identified by the port ID. When the reception control part 131 receives the position information and the flight range associated with the position information, the information acquisition part 132 acquires the circumferential information of the port P which may be located within the flight range covering the position of the position information. Based on the circumferential information of the port P which may be located within the flight range covering the port P identified by the port ID or the position of the position information, the determination part 133 determines whether or not the flight device 6 can be landed.

(Process for Determining Whether or not Flight Device 6 Makes a Takeoff or Landing)

The determination part 133 determines whether or not the flight device 6 makes a takeoff or landing according to circumstances of the port P indicated by the circumferential information acquired by the information acquisition part 132. Specifically, when the reception control part 131 receives a takeoff instruction to take off the flight device 6, the determination part 133 determines whether or not the flight device 6 can take off from the storage shed 4 according to circumstances of the port P equipped with the storage shed 4 configured to keep the flight device 6 therein. When the reception control part 131 receive the port ID together with the landing instruction to land the flight device 6, the determination part 133 determines whether or not the flight device 6 can be landed at the storage shed 4 according to circumstances of the port P identified by the port ID.

When the flight device 6 is not allowed to fly over the port P, the flight device 6 may not be allowed to take off from the storage shed 4 of the port P or to land at the storage shed 4 of the port P. For this reason, upon determining that the flight device 6 is allowed to fly over the port P according to circumstances of the port P, the determination part 133 determines that the flight device 6 may make a takeoff or landing at the port P. Upon determining that the flight device 6 is not allowed to fly over the port P, the determination part 133 determines that the flight device 6 cannot make a takeoff or landing at the port P.

For example, when the information acquisition part 132 acquires the weather information indicating fine weather, the determination part 133 determines that the flight device 6 can fly over the port P. When the information acquisition part 132 acquires the weather information indicating rainy weather, the determination part 133 determines that the flight device 6 cannot fly over the port P.

Even when the weather information indicates rainy weather, the determination part 133 may determine that the flight device 6 can fly over the port P when the airframe information indicates waterproofness. For example, the determination part 133 determines whether or not the flight device 6 can fly over the port P based on the weather information of the port P and the airframe information of the flight device 6. Specifically, when the airframe information indicates waterproofness, the determination part 133 determines that the flight device 6 can fly over the port P when the weather information indicates a rainfall below a predetermined rainfall. On the other hand, the determination part 133 determines that the flight device 6 cannot fly over the port P when the weather information indicates a rainfall above the predetermine rainfall.

A manager who manages the flight management system S may appropriately set the predetermined rainfall, whereas the determination part 133 may determine the predetermined rainfall for the flight device 6 based on the airframe information of the flight device 6. For example, the determination part 133 may determine a rainfall which may allow the flight device 6 to fly over the port P based on the waterproofness information when the airframe information includes the waterproofness information indicating the waterproofness of the flight device 6. Specifically, the determination part 133 increases a flight-enabled rainfall to be higher as the waterproofness of the flight device 6 becomes higher.

The determination part 133 may determine whether or not the flight device 6 can fly over the port P based on wind speed indicated by the weather information acquired by the information acquisition part 132. For example, the determination part 133 determines that the flight device 6 can fly over the port P when the wind speed acquired by the information acquisition part 132 is less than predetermined wind speed. On the other hand, the determination part 133 determines that the flight device 6 cannot fly over the port P when the wind speed acquired by the information acquisition part 132 is equal to or higher than the predetermined wind speed. In addition, the determination part 133 may change the predetermined wind speed with respect to each of the flight devices 6. For example, the determination part 133 determines the flight-enabled wind speed of the flight device 6 based on the maximum speed indicated by the airframe information of the flight device 6. Specifically, the determination part 133 may increase the flight-enabled wind speed to be higher as the maximum speed of the flight device 6 becomes higher.

When the information acquisition part 132 acquires the circumferential information including the obstacle information, the determination part 133 determines that the flight device 6 cannot make a takeoff or landing at the port P. Specifically, the determination part 133 determines that the flight device 6 cannot make a takeoff or landing at the port P when an object exists at an entry/exit port of the storage shed 4 at the port P or when a person or an animal exists in proximity to the entry/exit port of the storage shed 4. The determination part 133 produces a determination result upon determining whether or not the flight device 6 can make a takeoff or whether or not the flight device 6 can make a landing, thus notifying the transmission control part 134 of the determination result.

Upon receiving a notice of the determination result from the determination part 133, the transmission control part 134 transmits the determination result of the determination part 133 to the flight management device 2. Specifically, the transmission control part 134 transmits to the flight management device 2 the information indicating an incapacity to make a takeoff or landing with the flight device 6 when the determination part 133 determines that the flight device 6 cannot make a takeoff or landing. On the other hand, the transmission control part 134 transmits to the flight management device 2 the information indicating a capacity to make a takeoff or landing with the flight device 6 when the determination part 133 determines that the flight device 6 can make a takeoff or landing. Accordingly, it is possible for the flight management device 2 to suppress the flight device 6 from making a takeoff or landing irrespective of circumstances of the storage shed 4 which do not allow for a takeoff or landing with the flight device 6.

For example, the determination part 133 produces a determination result that the flight device 6 can fly over the port P based on the weather information of the port P and the airframe information of the flight device 6, and therefore the transmission control part 134 transmits the determination result to the flight management device 2. Accordingly, it is possible for the flight management device 2 to make a takeoff or landing with the flight device 6 which can fly over the port P irrespective of rainfall or wind blowing in the port P. Specifically, the flight management device 2 can control the flight device to land at the storage shed 4 in the port P close to an endpoint of the flight route set to the flight device 6. In addition, the flight management device 2 can control the scheduled flight device 6 to take off from the storage shed 4 in the port P. As described above, the flight management system S is able to reduce unscheduled flight instructions such as a change of a flight route of the flight device 6, and therefore it is possible to improve a flight safety with the flight device 6.

Hereinafter, a flow of processes to be executed by the control unit 13 of the storage facilities management device 1 will be described below.

[Outline of Process to Determine Capacity/Incapacity for Takeoff/Landing with Flight Device 6]

Figure 5:
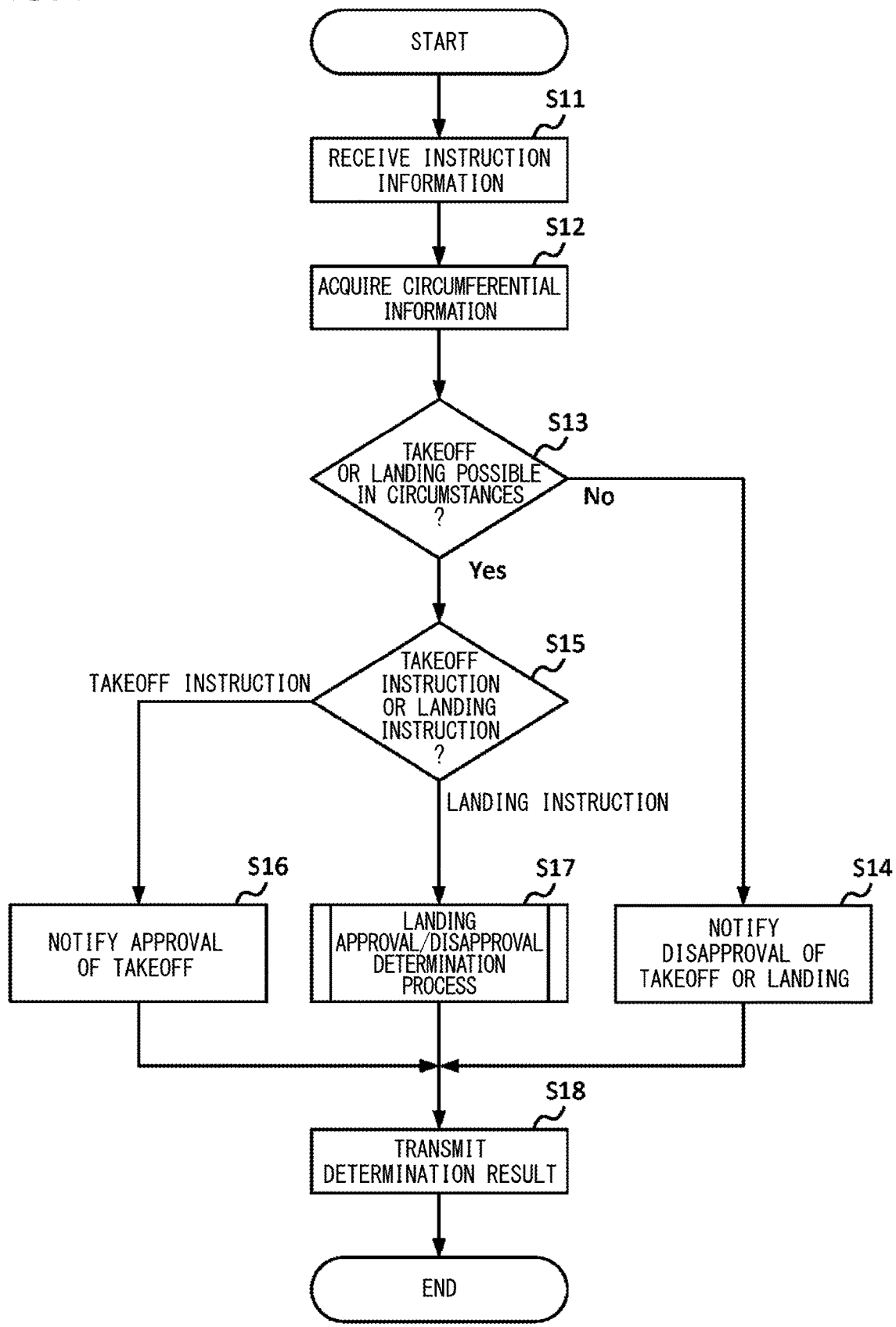
FIG. 5 is a flowchart showing a process to determine an approval or a disapproval of making a takeoff or landing with a flight device in the storage facilities management device of the present embodiment.

FIG. 5 is a flowchart showing a process for the control unit 13 of the storage facilities management device to determine an approval or a disapproval of making a takeoff or landing with the flight device 6. First, the reception control part 131 acquires from the flight management device 2 the instruction information including a takeoff/landing time of the flight device 6 (step S11).

Next, before it comes to the time included in the instruction information, the information acquisition part 132 acquires the circumferential information representing circumstances of the port P equipped with the storage shed 4 configured to keep the flight device 6 (step S12). Subsequently, the determination part 133 determines whether or not the flight device 6 can make a takeoff or landing based on circumstances indicated by the circumferential information of the port P (step S13). Specifically, the determination part 133 may determine whether or not the flight device 6 can make a takeoff or landing according to a method for determining whether or not the flight device 6 can make a takeoff or landing at the port P based on the aforementioned circumstances.

Upon determining that the flight device 6 cannot make a takeoff or landing (i.e. NO in step S13), the determination part 133 notifies the transmission control part 134 of its determination result indicating an incapacity to make a takeoff or landing with the flight device 6 (step S14). Upon determining that the flight device 6 can make a takeoff or landing (i.e. YES in step S13), the determination part 133 determines whether the reception control part 131 receives the instruction information indicating either a takeoff instruction or a landing instruction (step S15).

When the instruction information indicates the takeoff instruction (i.e. a takeoff instruction of step S15), the determination part 133 determines a capacity to make a takeoff with the flight device 6. The determination part 133 notifies the transmission control part 134 of its determination result indicating a capacity to make a takeoff with the flight device 6 (step S16). When the instruction information indicates a landing instruction (i.e. a landing instruction of step S15), the determination part 133 carries out a landing-approval/disapproval-determination process for determining an approval or disapproval of landing with the flight device 6 (step S17). Detailed descriptions about the landing-approval/disapproval-determination process will be provided. The determination part 133 carries out the landing-approval/disapproval-determination process so as to notify the transmission control part 134 of its determination result produced by determining whether or not the flight device 6 can make a landing. Subsequently, the transmission control part 134 transmits to the flight management device 2 the determination result produced by determining whether or not the flight device 6 can make a takeoff or landing (step S18).

[Process to Determine Capacity/Incapacity for Takeoff/Landing with Flight Device 6 Based on Takeoff/Landing Time of Another Flight Device 6]

As similar to the port P1 shown in FIG. 1, the port P may be equipped with a plurality of storage sheds 4. In this case, when a plurality of flight devices 6 approach a plurality of storage sheds 4 to make a takeoff or landing in the same time zone, a plurality of flight devices 6 may approach other flight devices 6 in the air. When a flight device 6 may approach another flight device 6 in the air, it is concerned with fears that those flight devices 6 may come in contact with each other.

For this reason, when the reception control part 131 receives the instruction information to make a takeoff or landing with the flight device 6, the determination part 133 determines whether or not the flight device 6 can make a takeoff or landing based on the takeoff/landing time of another flight device 6. Hereinafter, a process for determining an approval/disapproval of takeoff/landing with the flight device 6 based on a takeoff/landing time of another flight device 6 will be described with reference to FIG. 6.

Figure 6:
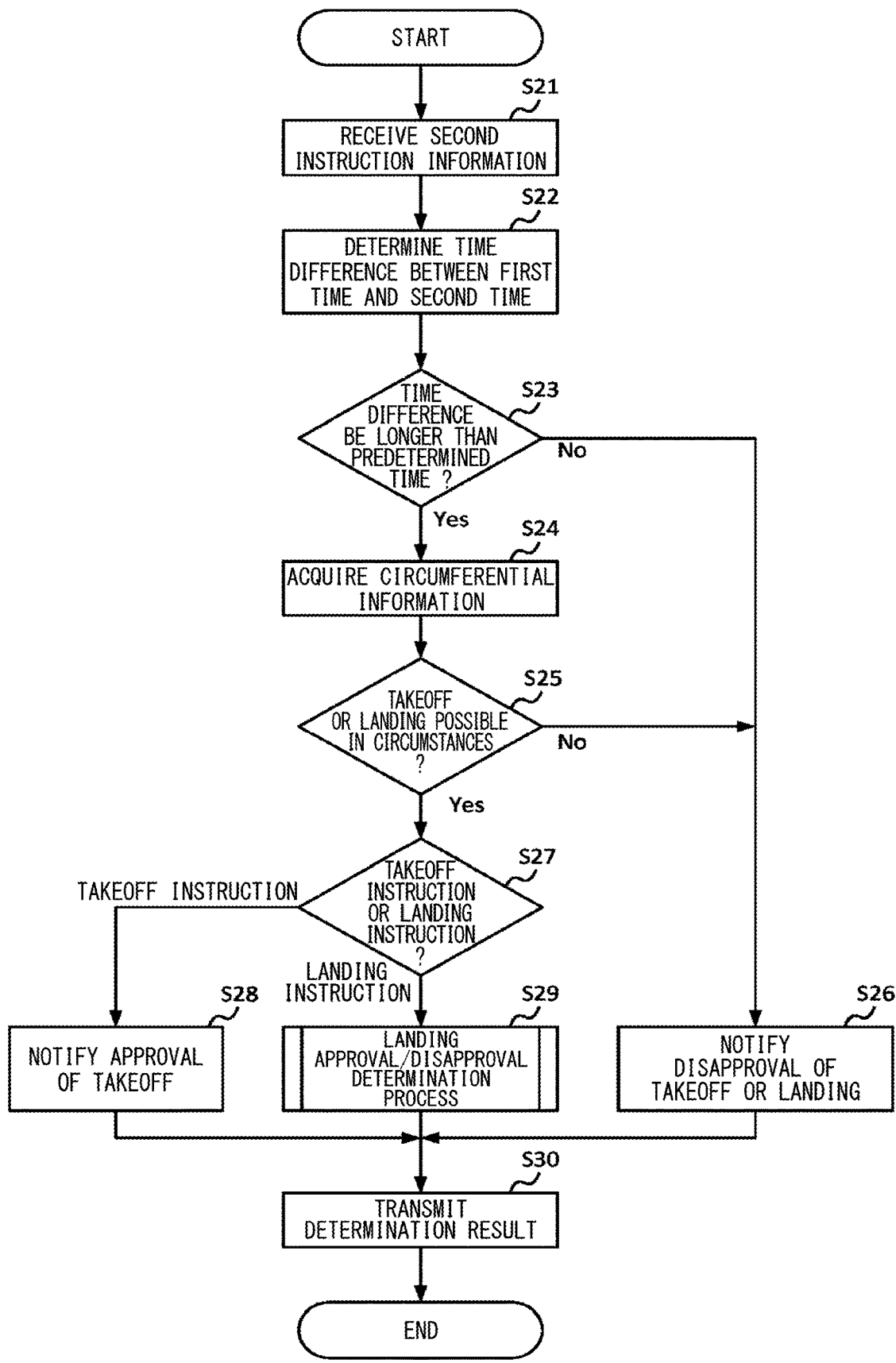
FIG. 6 is a flowchart showing a process to determine an approval or a disapproval of making a takeoff or landing with a flight device based on a takeoff/landing time of another flight device in the storage facilities management device of the present embodiment.

FIG. 6 is a flowchart showing a process to determine an approval or a disapproval of making a takeoff or landing with the flight device 6 based on a takeoff/landing time of another flight device 6. The flowchart of FIG. 6 is produced based on an assumption in which due to reception of first instruction information for making a takeoff or landing with the flight device 6, it has been already determined whether the flight device 6 can make a takeoff or landing according to circumstances. In addition, the storage unit 12 has stored a first time which is included in the first instruction information and at which it has been determined that the flight device 6 can make a takeoff or landing.

After receiving the first instruction information, the reception control part 131 receives second instruction information from the flight management device 2 (step S21). Next, the determination part 133 determines a time difference between the first time included in the first instruction information and a second time included in the second instruction information (step S22). Subsequently, the determination part 133 determines whether or not the time difference between the first time and the second time is longer than a predetermined time (step S23). For example, the predetermined time is produced by adding a presumed time, which may presume an irregular or accidental occurrence of a delay, to a time required for the flight device 6 to make a takeoff or landing.

When the time difference between the first time and the second time is longer than the predetermined time (i.e. YES in step S23), the determination part 133 determines that the flight device 6 associated with the second instruction information can make a takeoff or landing, and therefore the flow proceeds to step S24. When the time difference between the first time and the second time is equal to or less than the predetermined time (i.e. NO in step S23), the determination part 133 determines that the flight device 6 associated with the second instruction information cannot make a takeoff or landing, and therefore the flow proceeds to step S26. A series of steps S24 through S30 are similar to a series of steps S12 through S18 shown in the flowchart of FIG. 5; hence, their descriptions similar to the foregoing ones will be omitted here.

As described above, upon receiving new instruction information, the determination part 133 may determine whether or not the flight device 6 indicated by the new instruction information can make a takeoff or landing according to a result of determination as to whether or not the time included in the new instruction information is longer than the time stored on the storage unit 12 by the predetermined time. This makes it possible for the storage facilities management device 1 to make a takeoff or landing with a plurality of flight devices 6, which are each scheduled to make a takeoff or landing at the same port P, with a certain time interval between their takeoff/landing times, and therefore it is possible to suppress the flight device 6 from coming in contact with the other flight device 6.

In the above, the determination part 133 is configured to determine whether or not the flight device 6 can make a takeoff or landing according to a time difference between the first time and the second time; but this is not a restriction. The determination part 133 may determine whether or not the flight device 6 indicated by the second instruction information can make a takeoff or landing according to a result of determination as to whether or not the first time comes in a duration between the predetermined time before the second time included in the second instruction information and the predetermined time after the second time. Specifically, the determination part 133 determines that the flight device 6 indicated by the second instruction information cannot make a takeoff or landing when the first time comes in a duration between the predetermined time before the second time and the predetermined time after the second time. On the other hand, the determination part 133 does not determine that the flight device 6 indicated by the second instruction information can make a takeoff or landing when the first time does not appear in a duration between the predetermined time before the second time and the predetermined time after the second time.

In this connection, the determination part 133 may determine whether or not the flight device 6 indicated by the second instruction information can make a takeoff or landing according to a result of determination as to whether or not the second time appears in a predetermined time period including the first time. Specifically, the determination part 133 determines that the flight device 6 indicated by the second instruction information cannot make a takeoff or landing when the second time appears in the predetermined time period including the first time. On the other hand, the determination part 133 determines that the flight device 6 can make a takeoff or landing when the second time does not appear in the predetermined time period including the first time. The predetermined time period including the first time ranges from the predetermined time before the first time to the predetermined time after the first time.

[Landing-Approval/Disapproval-Determination Process]

When the reception control part 131 receives a landing instruction, the determination part 133 determines that the flight device 6 can make a landing according to circumstances, and then the determination part 133 carries out a landing-approval/disapproval-determination process as to whether or not the flight device 6 can make a landing at the storage shed 4. For example, when the reception control part 131 receives a port ID together with the landing instruction, the determination part 133 determines the port P identified by the port ID and then determined whether or not the flight device 6 can make a landing at the storage shed 4 in the port P. When the reception control part 131 receives the position information and a predetermined range of distance together with the landing instruction, the determination part 133 determines the port P located within the predetermined range of distance from the position indicated by the position information, and then determines whether or not the flight device 6 can make a landing at the storage shed 4 in the port P.

Figure 7:
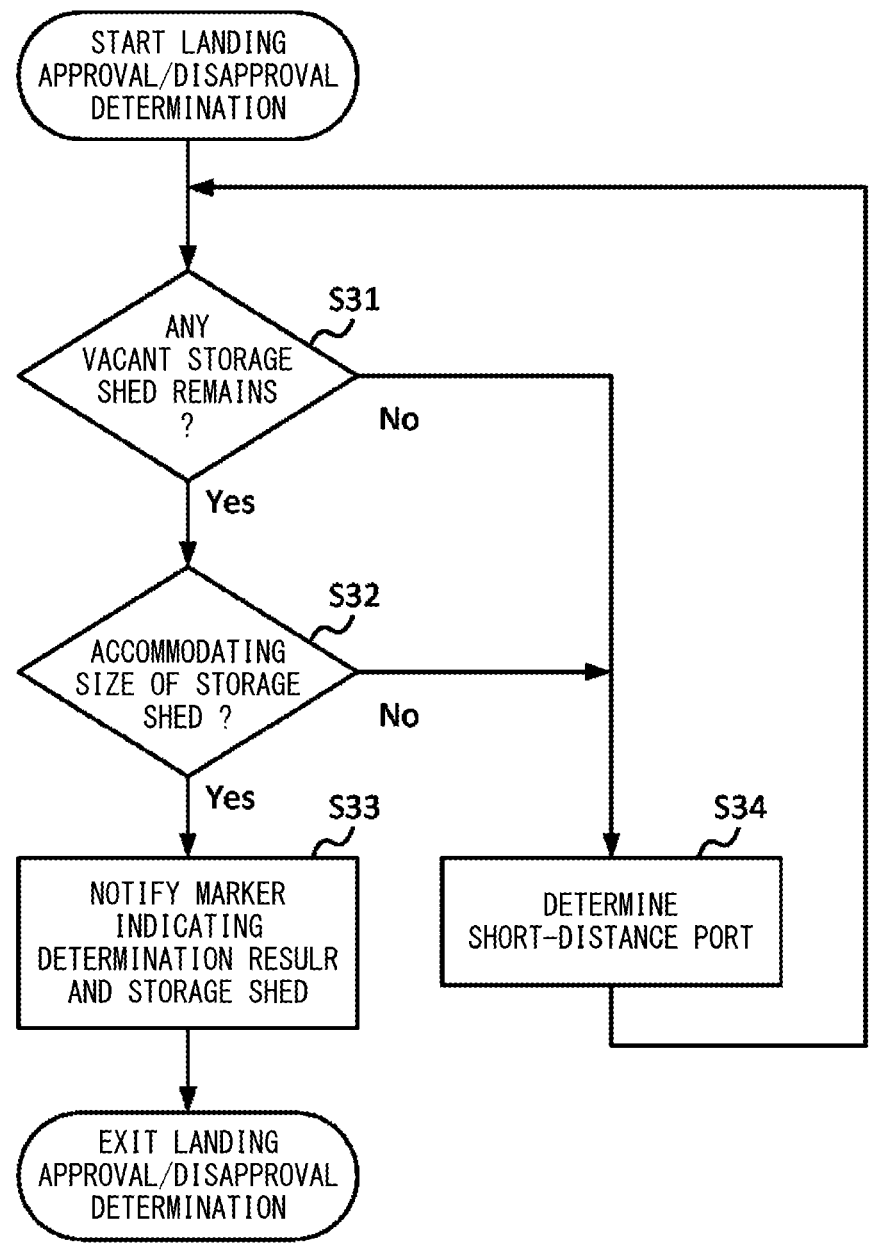
FIG. 7 is a flowchart showing a landing-approval/disapproval-determination process in a storage facilities management device of the present embodiment.

FIG. 7 is a flowchart of the landing-approval/disapproval-determination process. The determination part 133 determines whether or not a vacant storage shed 4 not accommodating the flight device 6 remains in the port P (step S31). When the determination part 133 determines the existence of a vacant storage shed 4 (i.e. YES in step S31), the flow proceeds to step S32. The determination part 133 determines whether or not the size of the flight device 6 may fit into an accommodating size of the vacant storage shed 4 (step S32). When the size of the flight device 6 can fit into the accommodating size of the vacant storage shed 4 (i.e. YES in step S32), the determination part 133 determines that the flight device 6 can make a landing, and therefore the flow proceeds to step S33.

In step S33, the determination part 133 notifies the transmission control part 134 of its determination result that the flight device 6 can make a landing. In addition, the determination part 133 determines the landing-period information representing a time period allowing for a landing of the flight device 6 and the position information representing the position of the storage shed 4 used for a landing of the flight device 6, thus notifying the transmission control part 134 of the landing-period information and the position information. In this connection, the time period indicated by the landing-period information allowing for a landing of the flight device 6 is a landing period determined for a landing of the flight device 6. Specifically, the landing period may be a time zone ranging from 9 o'clock to 10 o'clock.

The position information representing the position of the storage shed 4 may serve as the information indicating the position of the storage shed 4 in the port P. For example, the position indicating the position of the storage shed 4 in the port may serve as the identification information used to identify the storage shed 4, specifically, an image (hereinafter, referred to as a marker) used for recognizing a landing position when the flight device 6 makes a landing at the storage shed 4. The marker may be changed according to the flight device 6 scheduled to land at the storage shed 4. In addition, the marker can be differentiated with respect to a plurality of storage sheds 4. An operator who may operator the storage facilities management device 1 may appropriately set a display manner of the marker. Specifically, it is possible to use a circular symbol, a rectangular symbol, a double-circle symbol, or the like. Moreover, the marker is not necessarily limited any symbols, but it is possible to employ characters or figures.

Due to the nonexistence of the vacant storage shed 4 (i.e. NO in step S31) or when the size of the flight device 6 cannot fit into the accommodating size of the vacant storage shed 4 (i.e. NO in step S32), the determination part 133 may determine that the flight device 6 cannot be kept in the storage shed 4 of the port P. Upon determining that the flight device 6 cannot be kept in the storage shed 4 of the port P, the determination part 133 may determine another port P located in a short distance from the port P having the storage shed 4 indicating an incapacity to accommodate the flight device 6 (step S34).

For example, the determination part 133 determines a plurality of ports P, different from a first port P disapproving a landing of the flight device 6, which are each located within a predetermined distance from the first port P. The determination part 133 may select a second port P from among a plurality of ports P such that the second port P has a shorter distance from the first port P than other ports P. When the determination part 133 determines the second port P having a shorter distance from the first port P than other ports P, the flow proceeds to step S31. The determination part 133 repeats the aforementioned process until the determination part 133 determines the port P equipped with the storage shed 4 indicating a capacity to land the flight device 6.

In this connection, the determination part 133 may determine a plurality of second ports P. Upon determining a plurality of second ports P, the determination part 133 notifies the transmission control part 134 of a plurality of second ports P associated with the order information representing an order of second ports P counted from the second port P having a shorter distance from the first port P.
(Process of Transmission Control Part 134 Upon Determining a Capacity to Land Flight Device 6)

When the determination part 133 determines that the flight device 6 can make a landing at the storage shed 4, the transmission control device 134 transmits to the flight management device 2 the determination result indicating a capacity of landing. The transmission control part 134 transmits to the flight management device 2 the determination result together with the position information representing the position of the storage shed 4 and the landing-period information representing a time period approving a landing of the flight device 6. The time period indicated by the landing-period information indicating an approval of a landing of the flight device 6 is a time period which the determination part 133 determines that the flight device 6 can make a landing. Specifically, the landing period may be a time zone ranging from 9 o'clock to 10 o'clock.

Accordingly, due to needs to change the flight route of the flight device 6, for example, it is possible for an operator of the flight management device 2 to change the flight route such that the flight device 6 can reach the storage shed 4 within a time period approving a landing at the storage shed 4.

When the determination part 133 determines that the flight device 6 cannot make a landing at the first port P, the transmission control part 134 transmits the position information representing the position of a second storage shed 4 indicating a capacity of landing in the second port P. The second port P differs from the first port P equipped with a first storage shed 4 indicating an incapacity to land the flight device 6. Accordingly, it is possible for the flight management device 2 to acquire the position of a short-distant storage shed 4 located in a short distance from the storage shed 4 indicating an incapacity of landing and a time period allowing for a landing at the short-distant storage shed 4. For this reason, even when the flight device 6 needs to be charged due to a reduction of charging of it battery, for example, the flight management device 2 may easily land the flight device 6 at a landing-possible storage shed 4 in its flight time.
(A Flow of Processes of Flight Management System S when Flight Device 6 Lands at Storage Shed 4)

Hereinafter, a flow of processes executed by the flight management system S when the flight device 6 lands at the storage shed 4 will be described below. When the determination part 133 determines that the flight device 6 can make a landing at the storage shed 4, the transmission control part 134 transmits to the flight management device 2 a marker image associated with the storage shed 4 together with the determination result indicating a capacity of landing. In addition, the transmission control part 134 may transmit the marker image to the storage control device 3 installed in the port P equipped with the storage shed 4 allowing for a landing of the flight device 6.

The storage control device 3 displays the marker image on an image display device installed in the storage shed 4. The present embodiment may assume a liquid-crystal display as the image display device. In this connection, the image display device may be a liquid-crystal projector or any other displays capable of displaying the marker image.

The flight management device 2 transmits to the flight device 6 a marker image together with a landing instruction for the flight device 6 to land at the storage shed 4 of the port P, in which the determination part 133 determines that the flight device 6 can make a landing. Upon receiving the marker image, the flight device 6 may land at the storage shed 4 displaying the marker image. For example, the flight device 6 is equipped with a camera configured to capture a marker image displayed on the image display device of the storage shed 4, and then the flight device 6 determines whether or not the received marker image matches the displayed marker image of the image display device. Specifically, the flight device 6 will make a landing at the storage shed 4 upon determining that the received marker image matches the displayed marker image on the image display device of the storage shed 4. On the other hand, the flight device 6 will not make a landing at the storage shed 4 upon determining that the received marker image does not match the displayed marker image on the image display device of the storage shed 4. Accordingly, it is possible for the flight device 6 to land at the storage shed 4 designated by the storage facilities management device 1.

In this connection, upon acquiring the present time, the flight management system S may display the marker image on the image display device of the storage shed 4 only when the present time belongs to a landing-approved time. Accordingly, the flight device 6 can land at the storage shed 4 in the landing-approved time, but the flight device 6 cannot land at the storage shed 4 in a non-landing-approved time. That is, it is possible for the flight management system S to mistakenly land the flight device 6 at the storage shed 4 in the non-landing-approved time.

The storage facilities management device 1 determines whether or not the flight device 6 has made a landing at the storage shed 4. Upon acquiring from the storage control device 3 an image capturing the existence of the flight device 6 kept in the storage shed 4 in the landing-approved time, for example, the storage facilities management device 1 determines that the flight device 6 has landed at the storage shed 4. Upon acquiring an image capturing the nonexistence of the flight device 6 in the storage shed 4 after a lapse of the landing-approved time counted from the landing-scheduled time, however, the storage facilities management device 1 determines that the flight device 6 has not landed at the storage shed 4. Upon determining that the flight device 6 has not landed at the storage shed 4, the storage facilities management device 1 notifies the flight management device 2 of the information indicating that the flight device 6 does not land at the storage shed 4. Accordingly, it is possible for the flight management system S to notify a user who may desired to fly the flight device 6 in the air of the information as to whether or not the flight device 6 has successfully made a landing at the storage shed 4. This makes it easy for a user who may desired to fly the flight device 6 via the flight management device 2 to grasp the state of the flight device 6.

[Process to Open Door of Storage Shed 4]

The storage shed 4 may be occasionally equipped with a door to protect the flight device from wind and rain. In this case, it is concerned with fears that the flight device 6 might come in touch with the door when landing or taking off the flight device 6 at the storage shed 4 with its door not opened. For this reason, the storage facilities management device 1 needs to transmit to the storage control device 3 a door-open instruction to open the door of the storage shed 4 before it comes to a takeoff/landing time of the flight device 6. This makes it possible for the storage facilities management device 1 to open the door of the storage shed 4 when taking off or landing the flight device 6. Thus, it is possible for the storage facilities management device 1 to prevent the flight device 6 from accidentally coming in contact with the door of the storage shed 4. Hereinafter, a process to open the door of the storage shed 4 will be described below.

Figure 8:
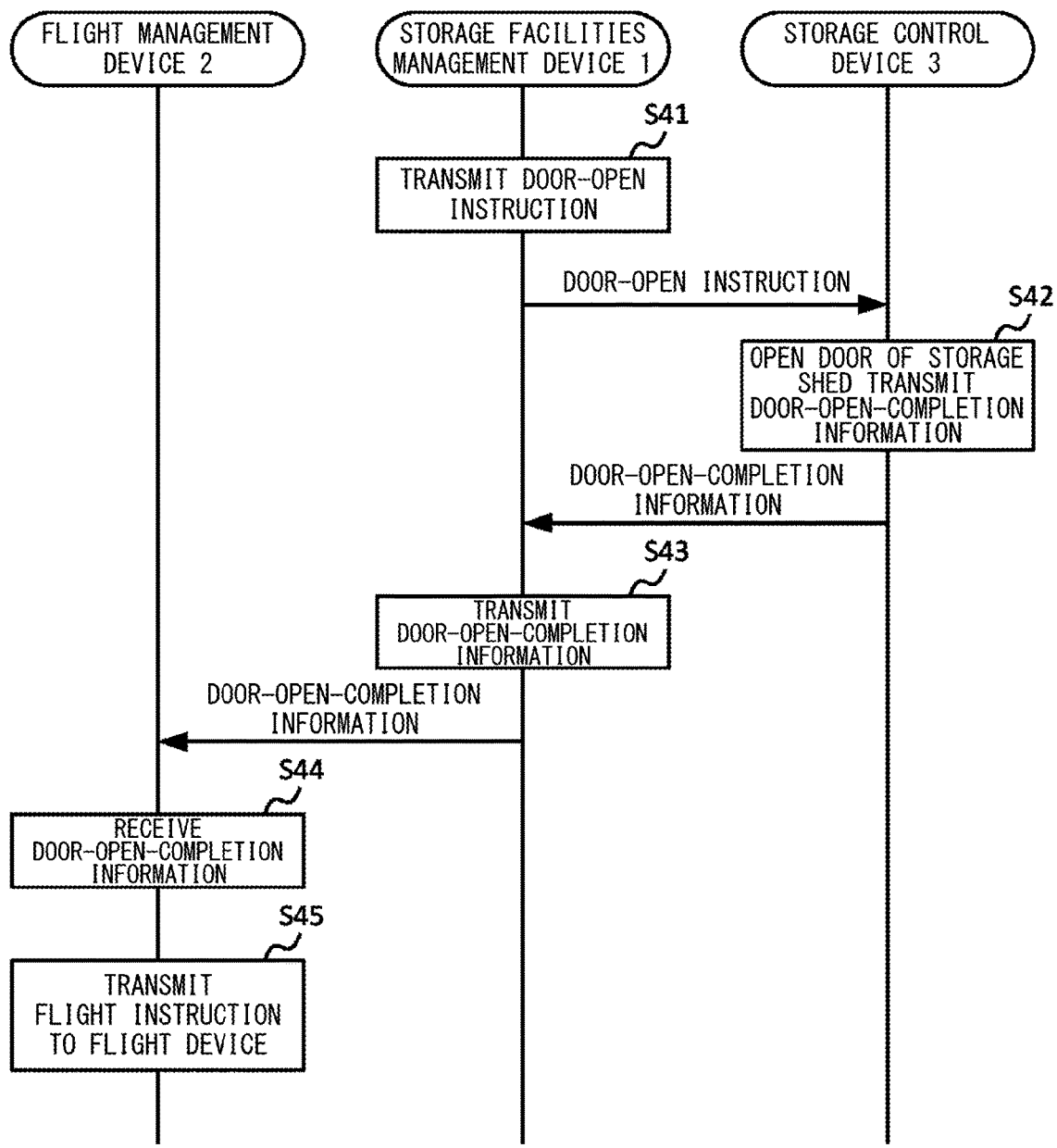
FIG. 8 is a sequence diagram showing a process to open a door of a storage shed in the storage facilities management device of the present embodiment.

FIG. 8 is a sequence diagram of a process to open the door of the storage shed 4. First, when the determination part 133 determines that the flight device 6 can make a takeoff or landing, the transmission control part 134 transmits to the storage control device 3 a door-open instruction to open the door of the storage shed 4 before it comes to the time included in the instruction information (step S41). Upon receiving the door-open instruction, the storage control device 3 controls the storage shed 4 indicated by the door-open instruction to open its door. After opening the door of the storage shed 4, the storage control device 3 transmits the door-open-completion information representing that the door of the storage shed 4 has been opened (step S42).

The reception control part 131 receives from the storage control device 3 the door-open-completion information representing that the door of the storage shed 4 has been opened. When the reception control part 131 receives the door-open-completion information, the transmission control part 134 transmits the door-open-completion information to the flight management device 2 (step S43).

The flight management device 2 receives the door-open-completion information from the storage facilities management device 1 (step S44). Upon receiving the door-open-completion information, the flight management device 2 determines that the flight device 6 can make a takeoff or landing at the storage shed 4. According to this determination, the flight management device 2 transmits to the flight device 6 a flight instruction to take off the flight device 6 from the storage shed 4 or a flight instruction to land the flight device 6 at the storage shed 4 (step S45).

[Process to Close Door of Storage Shed 4]

As described above, the storage shed 4 is equipped with a door to protect the flight device 6 from wind or rain. Despite the provision of the door with the storage shed 4, it may be impossible to protect the flight device 6 or the inside of the storage shed 4 from wind or rain when the door of the storage shed 4 is still opened after the flight device 6 takes off from the storage shed 4 or the flight device 6 lands at the storage shed 4. For this reason, the storage facilities management device 1 transmits to the storage control device 3 a door-close instruction to close the door of the storage shed 4 upon completion of the takeoff or landing of the flight device 6. Accordingly, it is possible for the storage facilities management device 1 to reliably close the door of the storage shed 4 after completion of the operation of the flight device 6. Therefore, it is possible for the storage facilities management device 1 to reliably protect the flight device 6 or the inside of the storage shed 4 from wind or rain. Hereinafter, a process to close the door of the storage shed 4 will be described below.

Figure 9:
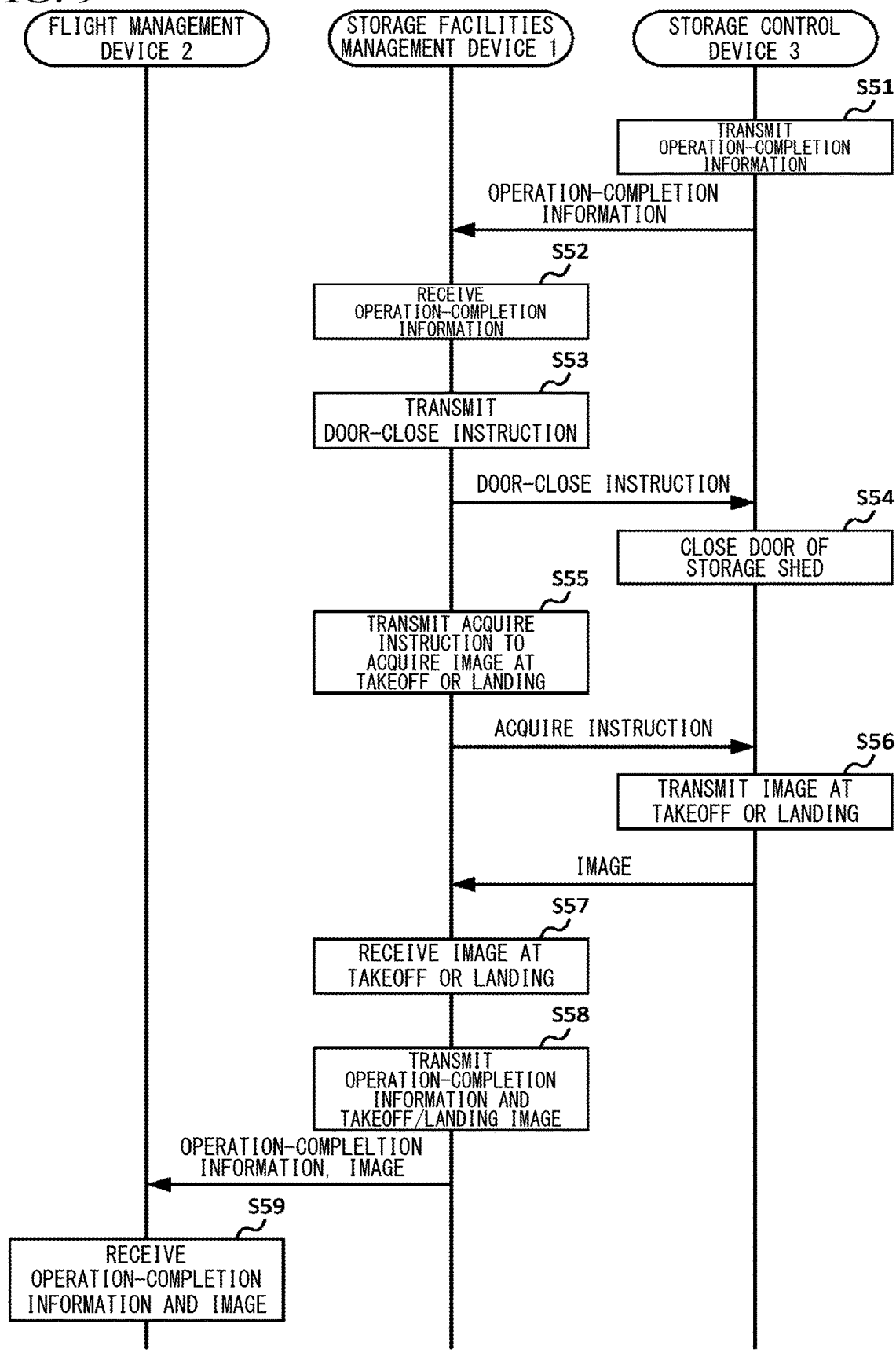
FIG. 9 is a sequence diagram showing a process to close a door of a storage shed in the storage facilities management device of the present embodiment.

FIG. 9 is a sequence diagram showing the process to close the door of the storage shed 4. First, upon completion of the takeoff or landing of the flight device 6, the storage control device 3 transmits to the storage facilities management device 1 the operation-completion information representing completion of the takeoff or landing of the flight device 6 (step S51). Based on an image of the storage shed 4 captured by a camera of the storage shed 4 or sensing data generated by a sensor attached to the storage shed 4, the storage control device 3 determines whether or not the flight device 6 has made a takeoff from the storage shed 4 or a landing at the storage shed 4. In this connection, the storage facilities management device 1 configured to acquire the captured image or sensor's signal values from the storage control device 3 may determine whether or not the flight device 6 has made a takeoff from the storage shed 4 or a landing at the storage shed 4.

The reception control part 131 receives from the storage control device 3 the operation-completion information representing completion of the takeoff or landing of the flight device 6 (step S52). When the reception control part 131 receives the operation-completion information, the transmission control part 134 transmits to the storage control device 3 a door-close instruction to close the door of the storage shed 4 (step S53). Upon receiving the door-close instruction from the storage facilities management device 1, the storage control device 3 will close the door of the storage shed 4 (step S54). Accordingly, the storage facilities management device 1 may close the door of the storage shed 4 after completion of the operation of the flight device 6, and therefore it is possible to protect the inside of the storage shed 4, which becomes vacant due to the takeoff of the flight device 6 from the storage shed 4 or the landing of the flight device at the storage shed 4, from wind or rain.

After transmitting the door-close instruction, the storage facilities management device 1 transmits to the storage control device 3 an image-capture instruction to capture an image of the flight device 6 when taking off from the storage shed 4 or an image of the flight device 6 when landing at the storage shed 4 (step S55). Upon receiving the image-capture instruction, the storage control device 3 captures an image of the flight device 6 when taking off from the storage shed 4 or an image of the flight device 6 when landing at the storage shed 4, thus transmitting the captured image to the storage facilities management device 1 (step S56).

The reception control part 131 receives from the storage control device 3 an image of the flight device 6 when taking off from the storage shed 4 or an image of the flight device 6 when landing at the storage shed 4 (step S57). Subsequently, the transmission control part 134 transmits to the flight management device 2 the operation-completion information received by the reception control part 131 together with an image of the flight device 6 when taking off from the storage shed 4 or an image of the flight device 6 when landing at the storage shed 4 (step S58). Thus, the flight management device 2 receives from the storage facilities management device 1 the operation-completion information together with an image of the flight device 6 when taking off from the storage shed 4 or an image of the flight device 6 when landing at the storage shed 4 (step S59). Accordingly, an operator who may manage the flight management device 2 can visually confirm a takeoff state of the flight device 6 when taking off from the storage shed 4 or a landing state of the flight device 6 when landing at the storage shed 4 by watching images. This makes it easy for an operator who may manage the flight management device 2 to manage the state of the flight device 6.

[Advantageous Effect of Storage Facilities Management Device 1 of Present Embodiment]

As described above, the storage facilities management device 1 is configured to receive from the flight management device 2 the instruction information including the takeoff/landing time of the flight device 6 and to acquire the circumferential information representing circumstances of the storage shed 4 before it comes to the time included in the instruction information. Subsequently, the storage facilities management device 1 may determine whether or not the flight device 6 can make a takeoff or landing at the storage shed 4 based on the circumferential information, thus transmitting the determination result to the flight management device 2. Accordingly, it is possible for the storage facilities management device 1 to improve safety when taking off or landing the flight device 6.

Heretofore, the present embodiment has been described by way of the foregoing embodiment and examples, but the technical scope of the present invention is not necessarily limited to the scope of the foregoing embodiment; hence, it is possible to make various modifications and changes within the scope of the subject matter of the invention. For example, concrete examples for distributing or integrating various devices described above are not necessarily limited to the foregoing embodiment, and therefore the entirety or part of configurations can be physically or functionally distributed or integrated in arbitrary units of elements. In addition, the present invention may embrace new embodiments configured of arbitrary combinations of examples. Therefore, the present invention may demonstrate additional effects of new embodiments configured of arbitrary combinations of examples together with advantageous effects originally achieved by the invention.

REFERENCE SIGNS LIST

1 storage facilities management device
2 flight management device
3 storage control device
4 storage shed
5 base station
6 flight device
11 communication unit
12 storage unit
13 control unit
131 reception control part
132 information acquisition part
133 determination part
134 transmission control part
P port
S flight management system

The invention claimed is:

1. A storage facilities management device comprising a processor to execute instructions stored on a memory to:
receive instruction information including a takeoff time and/or a landing time scheduled for a flight device from a flight management device configured to manage an operation of the flight device;
before the takeoff time or the landing time included in the instruction information, acquire circumstantial information representing circumstances of a storage shed for keeping the flight device therein;
determine whether or not the circumstantial information allows the flight device to fly over the storage shed according to the instruction information, thus storing an association between a flight-device identification of the flight device and a storage identification of the storage shed; and
transmit a determination result to the flight management device, thus causing the flight management device to send a takeoff instruction or a landing instruction to the flight device.

2. The storage facilities management device according to claim 1, wherein the processor is further configured to determine that the storage shed is accommodatable for the flight device at the landing time of the instruction information when the storage identification has not been associated with the flight-device identification.

3. The storage facilities management device according to claim 1, wherein upon receiving secondary instruction information after the instruction information, the processor is further configured to determine that the flight device is not allowed to take off or land when a time difference between the instruction information and the secondary instruction information is below a predetermined time needed for the flight device to take off or land.

4. The storage facilities management device according to claim 1, wherein upon determining that the flight device is allowed to land at the storage shed, the processor is further configured to transmit position information representing a position of the storage shed and landing-period information representing a time zone allowing the flight device to land at the storage shed.

5. The storage facilities management device according to claim 4, wherein upon determining that the flight device is not allowed to land at the storage shed, the processor is further configured to transmit secondary position information representing a position of a secondary storage shed and secondary landing period information representing a time zone for the flight device to land at the secondary storage shed.

6. The storage facilities management device according to claim 1, wherein the circumstantial information includes weather information relating to weather in a periphery of the storage shed and/or obstacle information representing existence of an obstacle in the periphery of the storage shed, and wherein the processor is further configured to determine that the flight device is not allowed to land at the storage shed according to the weather information and/or the obstacle information.

7. The storage facilities management device according to claim 1, wherein upon determining that the flight device is allowed to land at the storage shed, the processor is further configured to transmit to a storage control device configured to control the storage shed a door-open instruction to open a door of the storage shed before the landing time of the flight device.

8. The storage facilities management device according to claim 7, wherein upon receiving door-open-completion information representing a completion of opening the door of the storage shed from the storage control device, the processor is further configured to transmit the door-open-completion information to the flight management device, thus causing the flight management device to send the landing instruction to the flight device.

9. The storage facilities management device according to claim 7, wherein upon receiving operation-completion information representing a completion of the operation of the flight device from the storage control device, the processor is further configured to transmit a door-close instruction to the storage control device to close the door of the storage shed.

* * * * *